United States Patent
Kaiser

Patent Number: 5,191,629
Date of Patent: Mar. 2, 1993

[54] LASER MODULE

[75] Inventor: Manfred Kaiser, Hemmingen, Fed. Rep. of Germany

[73] Assignee: Alcatel N.V., Amsterdam, Netherlands

[21] Appl. No.: 672,891

[22] Filed: Mar. 21, 1991

[30] Foreign Application Priority Data

Mar. 23, 1990 [DE] Fed. Rep. of Germany ....... 4009380

[51] Int. Cl.$^5$ .............................................. G02B 6/42
[52] U.S. Cl. ........................................ 385/90; 385/93
[58] Field of Search .............................. 385/88, 90, 93

[56] References Cited

U.S. PATENT DOCUMENTS

| | | | |
|---|---|---|---|
| 4,435,037 | 3/1984 | Abramson et al. | 385/90 |
| 4,456,334 | 6/1984 | Henry et al. | 385/90 |
| 4,707,067 | 11/1987 | Haberland et al. | 385/90 |
| 4,790,618 | 12/1988 | Abe | 350/96.15 |
| 4,840,450 | 6/1989 | Jones et al. | 385/90 |
| 4,868,361 | 9/1989 | Chande et al. | 219/121 |
| 4,884,015 | 11/1989 | Sugimoto et al. | 385/90 |
| 4,927,228 | 5/1990 | Van De Pas | 385/90 |
| 4,955,014 | 9/1990 | Kuppers et al. | 370/3 |
| 5,029,965 | 7/1991 | Tan | 385/90 |

FOREIGN PATENT DOCUMENTS

| | | |
|---|---|---|
| 3413749 | 10/1985 | Fed. Rep. of Germany . |
| 3705408 | 8/1988 | Fed. Rep. of Germany . |
| 2418943 | 9/1979 | France . |
| 57-09359 | 6/1982 | Japan . |
| 2184289 | 6/1987 | United Kingdom . |

Primary Examiner—John D. Lee
Assistant Examiner—Robert E. Wise
Attorney, Agent, or Firm—Brunell & May

[57] ABSTRACT

There is no problem to excite the fundamental mode in a single-mode optical waveguide, if a laser is used whose operating wavelength is above the cutoff wavelength of the guide. However, these lasers are presently very expensive.

Especially for the use in the subscriber area, where the relatively short transmission lengths allow to accept a certain amount of attenuation, it is proposed to use an inexpensive laser (6) whose operating wavelength, however, lies below the cutoff wavelength of the coupled optical waveguide (10). The excitation of only the fundamental mode is, according to the invention, possible with such a laser (6). A single-piece metallic module housing (1) is provided in which the laser (6), being moved perpendicularly to the module housing axis (1), is aligned to it by adjusting screws (12). A magnifying optic (9) is provided. The magnification causes a decrease of the angle at which the laser light reaches the face of the optical waveguide (10). The optical waveguide (10), being coaxially centered in a cylindrical bore (5), is adjusted axially to an optimal coupling and then fixed.

5 Claims, 2 Drawing Sheets

LASER MODULE

TECHNICAL FIELD

The invention relates a laser module as set forth in the preamble of claim 1.

CLAIM FOR PRIORITY

This application is based on and claims priority from an application first filed in Germany under Application No. P 40 09 380.8. To the extent such prior application may contain any additional information that might be of any assistance in the use and understanding of the invention claimed herein, it is hereby incorporated by reference.

BACKGROUND ART

[Published German Patent Application] DE 34 13 749 A1 discloses a laser module having a rotationally symmetric housing consisting of two sections. One of the sections contains a fixedly mounted encased semiconductor laser. The other contains the imaging lens and the subscriber optical waveguide, both fixedly mounted. The position of the semiconductor laser is determined by the fit of the laser casing in a recess in the one section. The laser chip typically is not located exactly in its intended position, but is spatially dislocated from it by a range of several tens of nanometers. Thus, the optical axis of the laser does not coincide with the centerline of its housing section; furthermore, the position of the laser varies in the axial direction from its intended position. These deviations are eliminated by adjusting. both sections of the module to each other to obtain the maximum intensity of the light exiting at the end of the subscriber optical waveguide. In this position to each other, both housing sections are immovably connected to each other by welding, soldering or cementing. The localized heat application during welding or soldering of the two sections may result in distortions, causing loss of adjustment. Cementing, on the other hand, is critical considering the mechanical and thermal stability. A correction of the angular deviation between the optical axis of the laser chip and the mechanical axis of the laser casing does not take place. Furthermore, the bisectioned character of the module housing is disadvantageous, because locally applied changes of temperature cannot spread fast nor evenly enough over the weld or solder joints or the cemented connections. This is however, of grave importance, since partial distortions of the laser housing, caused by temperature, do influence the adjustment. Lastly, the fixed coordination of the imaging optics to the subscriber optical waveguide rules out another means to optimize. Also, the bisectioning of the housing is uneconomical due to higher costs of manufacturing.

SUMMARY OF INVENTION

The object of the invention is to provide a laser module which makes the coupling of a laser to an optical waveguide so optimal as to ensure a stable single-mode operation with a semiconductor laser operating below the cutoff wavelength of the optical waveguide.

This object is attained by the means stated in claim 1. The dependent claims are directed to advantageous embodiments of specific objects of the invention.

The advantages provided by the invention are especially as follows: the module housing is a single piece and metallic, therefore producible economically and providing an unimpeded thermal conductivity which eliminates the influence of temperature changes; the adjustability of the laser in relation to the module housing allows the alignment of the optical axis with the mechanical axis of the housing, so that the emission of the laser is coupled concentrically to the imaging optic; the magnifying optic causes the axial emission to reach the optical waveguide at an angle allowing the optimal coupling of the light output; the subscriber optical waveguide in the concentric bore of the module housing can be adjusted to the optimal image of the light spot of the laser on the face of the optical waveguide, before being fixed.

BRIEF DESCRIPTION OF DRAWINGS

Using an illustrative embodiment, the invention is explained in detail with reference to the appended drawings. The following is shown.

BEST MODE FOR CARRYING OUT THE INVENTION

DE 36 37 097 A1 discloses in detail that single-mode optical waveguides operate in single-mode only for wavelengths above a cutoff wavelength, that is, above the cutoff wavelength only the fundamental mode can propagate. On the other hand, below the cutoff wavelength, several modes can propagate.

For long-distance communication, the optical transmission medium commonly used is a single-mode optical waveguide (referred to below as OWG) having above the cutoff wavelength in the range of 1300 to 1600 nanometers the lowest attenuation and dispersion. This OWG type, presently optimal for long-distance communication, is being currently produced in considerable volume at corresponding price.

It is already known that this single-mode OWG also is a suitable OWG type for optical subscriber application. The high cost of the electro-optical or optical-electrical transducers, until now considered as necessary, hindered the introduction of optical wide-band subscriber connections.

Tolerating an increased attenuation, which, however, can be accepted for use in the subscriber communication range (approx. 6 to 12 km), the beforementioned patent application teaches that a stable single-mode operation can be achieved with a semiconductor laser working far below the cutoff wavelength of the OWG. This is a laser type with an operational wavelength of 780 nanometers, such as the one used in CD players, produced in a very high volume and, therefore, at a low price. Comparably low-cost receivers are available in the form of silicon-based photodiodes.

The object of the beforementioned patent application, as well as that of the present invention, is to make it possible to obtain a stable single-mode operation with a laser working below the cutoff wavelength of a single-mode OWG. This can be attained only under optimal circumstances such as the geometric coordination of the laser and the OWG and the coupling of the laser emission to the OWG.

Figure 1:
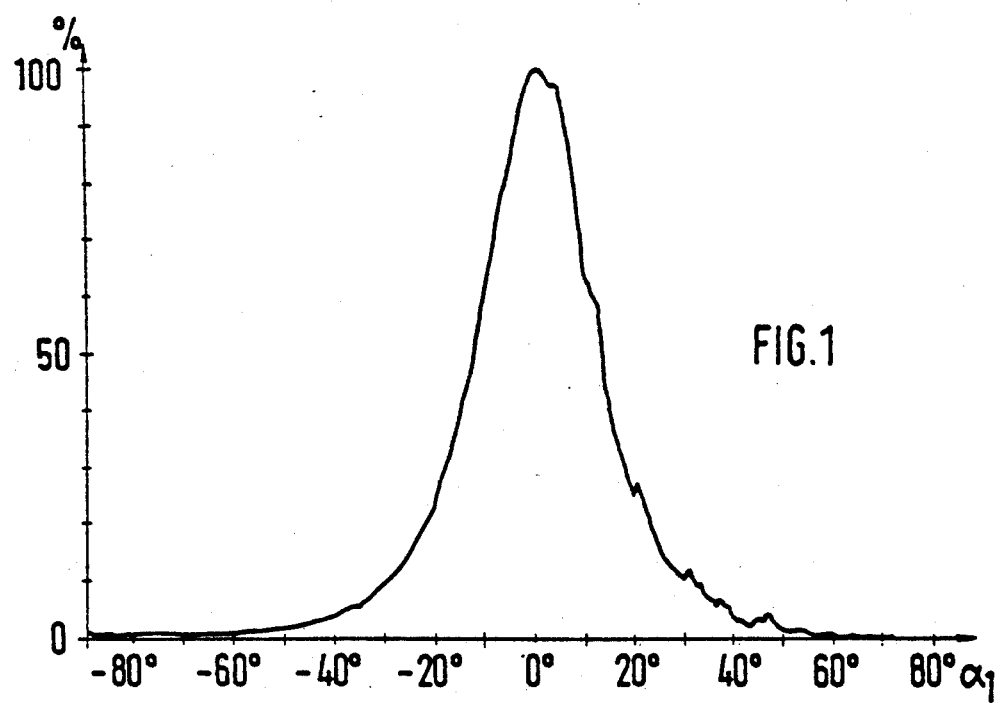
FIG. 1—the emission diagram of a commercial semiconductor laser diode.

FIG. 1 shows the typical intensity curve of the laser emission over the emission angle α1.

Figure 2:
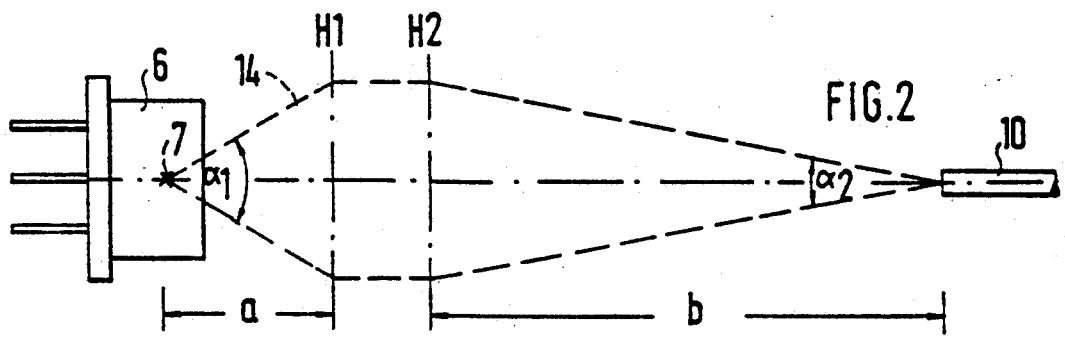
FIG. 2—the focusing of a laser emission as shown in FIG. 1 onto the core area of an optical waveguide by a magnifying optic, FIG. 3—a laser module according to the invention, Section III—III of FIG. 4, FIG. 4—the laser module, Section IV—IV of FIG. 3, FIG. 5—a schematic illustration of the means for the compensation of divergent mechanical and optical axes.

FIG. 2 shows the focusing and coupling of the emitted light energy 14 of a semiconductor laser 6 in the range of the emission angle α through an imaging optic 9 on the face area of an OWG 10. The laser emission is strongly divergent. Considering the above-mentioned increased line attenuation, the power of the laser 6 emission must be utilized optimally, for example, over an angle α1 of ±30°. The angle α2 at which the laser emission is coupled into the OWG 10, however, must not exceed the acceptance angle of the fiber. The light emitting area of a laser chip 7 being small compared to the core area of the OWG 10, the spatial angle α2 of the emission to be coupled can be reduced according to the relation $$a \cdot \tan \alpha_1 = b \cdot \tan \alpha_2/2$$

whereby the magnifying factor is limited by the ratio of the core face area to the emitting area of the laser.

Figure 3:
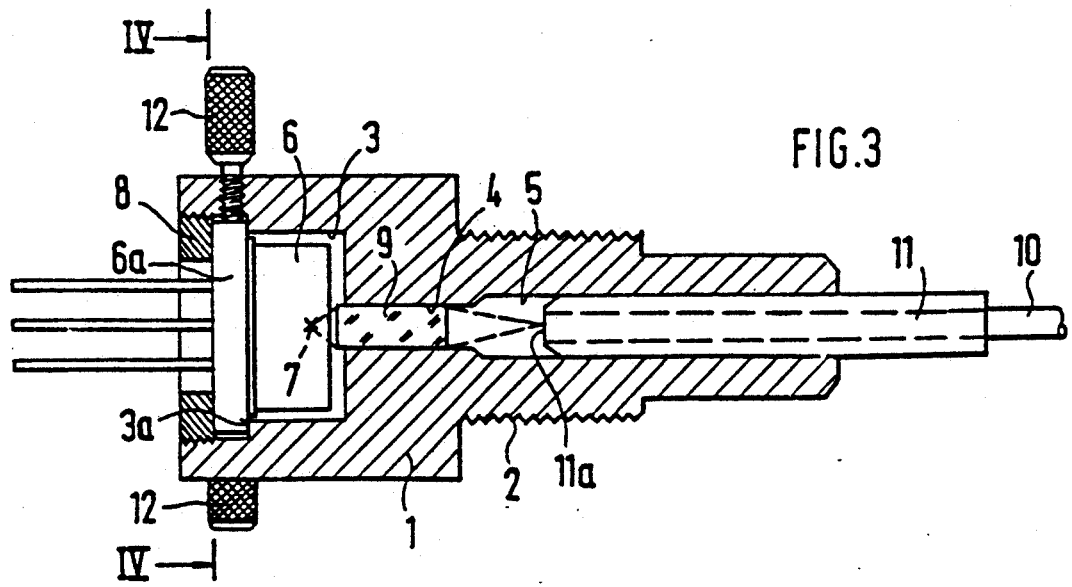
Figure 4:
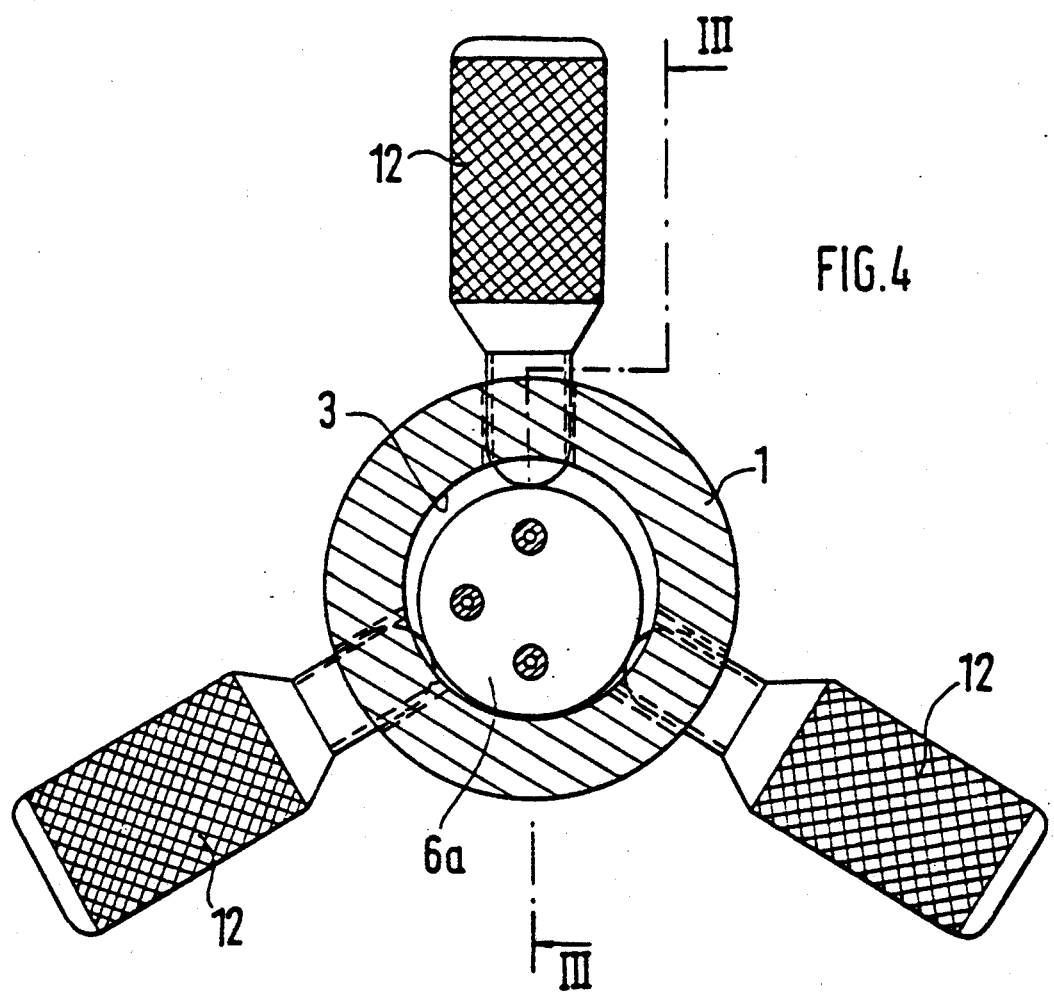
Figure 5:
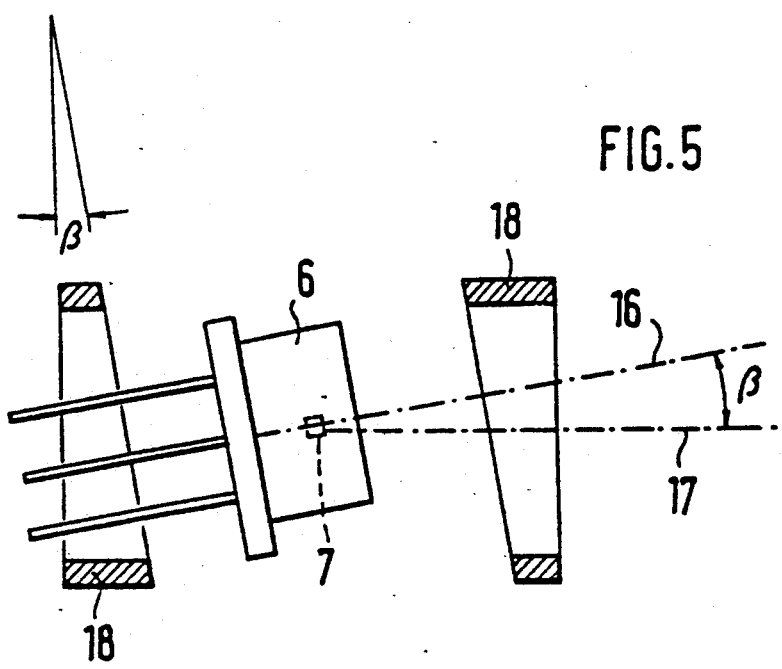

FIG. 3 shows a laser module in the Section III—III of FIG. 4 in which a laser 6 with an operational wavelength of 780 nm is used and a single-mode filament as the subscriber OWG 10.

The module housing 1 is a rotationally symmetric body formed of a metal having good heat conductivity. Passing through the middle of the three-chambered housing 1 is a central bore 4 fitting the diameter of a magnifying lens 9. At one end the housing 1 has, concentric with the central bore 4, a round counterbore 3 which at its outer end is stepped up to a larger diameter. The resulting ring shaped area 3a is used as a stop for the flange 6a of the laser 6 in the assembled condition. The counterbore 3 has a slightly larger diameter than the case of the laser 6 and the diameter of the stepped up end is slightly larger than that of the laser flange 6a. The outermost end of the stepped up portion has an internal thread accommodating the ring nut 8. At the location of the flange 6a the module housing 1 has three adjustment means, arranged in a triangle and pointing towards the central axis (FIG. 4). In the embodiment shown, these are adjustment screws 12 which are actuated manually. However, they may also be positioning rods driven by positioning motors whose motions are computer coordinated. At the other end the module housing 1 has a cylindrical bore 5 which is concentric with the central bore 4. The near end of the subscriber OWG 10 is concentrically surrounded by a cylindrical sleeve 11 whose face 11a is ground down to the OWG 10, flat and normal to the central axis. The sleeve 11 fits the cylindrical bore 5 without play. The middle portion of the module housing 1 carries a thread 2 to allow the module 1 to be mounted, for instance in a holder.

The laser flange 6a which contacts the stop plane 3a is the reference plane of the laser 6. The location of the laser chip 7 in relation to it and to the central axis deviates spatially by up to ±80 μm. If these deviations from the nominal location are not corrected, the lateral offset from the central axis would not allow the laser light to couple rotationally symmetric into the core of the OWG 10. Already an eccentric offset of more than 2 μm leads to an objectionable excitation of the mode LP11. For the adjustment of the laser 6 (and thereby of the chip 7) relative to the central axis, adjustment screws 12 are provided.

FIG. 4 shows in Section IV—IV of FIG. 3 the arrangement of the three adjustment screws 12 acting upon the flange 6a of the laser 6. By a simultaneous operation of two adjustment screws 12 at a time, the laser 6 can be moved within the clearance of the counterbore 3 in the laser housing 1. The adjustment is carried out in the unmodulated operational condition of the laser 6, to a maximum light intensity exiting from the end of the subscriber OWG 10. The adjustment is fixed by tightening the ring nut 8 having been just hand tight during adjustment. The axial tolerance range between the laser chip 7 and the imaging optic 9 can be maintained, in extreme situations, by shim discs. Generally, trimming is not necessary here, since this error affects merely the acceptance by the imaging optic 9 of the laser light emission, and is relatively small. The adjustment completed, the cylindrical sleeve 11 is positioned and fixed in the bore 5 such that the image of the laser light area, magnified by the imaging optic 9, falls exactly onto the face 11a of the sleeve 11, that is on the face plane of the OWG 10. The previously carried out adjustment of the optical axis of the laser 6 to the central axis of the module housing 1 ensure a rotationally symmetric imaging of the laser light spot on the core face. This provides the prerequisite for the OWG 10 to be excited in the fundamental mode only. The optimal adjustment, here also, is indicated by the intensity of the light exiting at the end of the subscriber OWG 10.

The imaging optic 9 in the presented embodiment is a gradient index lens with a magnification imaging ratio of 1:3. The latter may vary depending on the imaging system.

I claim:

1. A laser module comprising
   a rotationally symmetric housing defining a central axis, said housing being of one-piece construction and made of metal,
   an axially symmetric recess at one end of the housing and disposed concentrically about said central axis,
   a cylindrical bore at a second end of the housing and also disposed concentrically about said central axis,
   an encased semiconductor laser inside said recess and with a slightly smaller diameter than said recess,
   an optical waveguide extending from the second end of the housing and having a front end fixed inside said cylindrical bore,
   a magnifying lens axially centered in the housing between the semiconductor laser and the optical waveguide, and
   means for positioning the laser in alignment with the central axis of the housing, said means further comprising
   three actuators arranged radially at approximately 120° from each other with each directed toward the central axis and in contact with the encased semiconductor laser, whereby a precise and stable adjustment of the encased semiconductor laser relative to the imaging lens may be achieved without soldering or welding.

2. A laser module as claimed in claim 1, wherein said optical waveguide incudes a central core having a predetermined acceptance angle and the magnifying ratio of the lens is such that the solid angle of the light launched into the core is less than or equal to said acceptance angle.

3. A laser module as claimed in claim 1, wherein the lens is a graded-index lens.

4. A laser module as claimed in claim 1, wherein the front end of the optical waveguide is surrounded by a concentric sleeve fixed about a common longitudinal axis, with the front end of the optical waveguide and the corresponding end of the concentric sleeve being ground to define a face plane perpendicular to said longitudinal axis.

5. A laser module as claimed in claim 1, wherein said recess defines a stop, said laser has a flange abutting said stop, and said positioning means further comprises a ring nut for maintaining said flange in a fixed position relative to said stop after the laser has been aligned by said actuators.

* * * * *